April 11, 1933.  C. H. FOSTER  1,903,447
SHOCK ABSORBER
Filed June 7, 1929   3 Sheets-Sheet 1
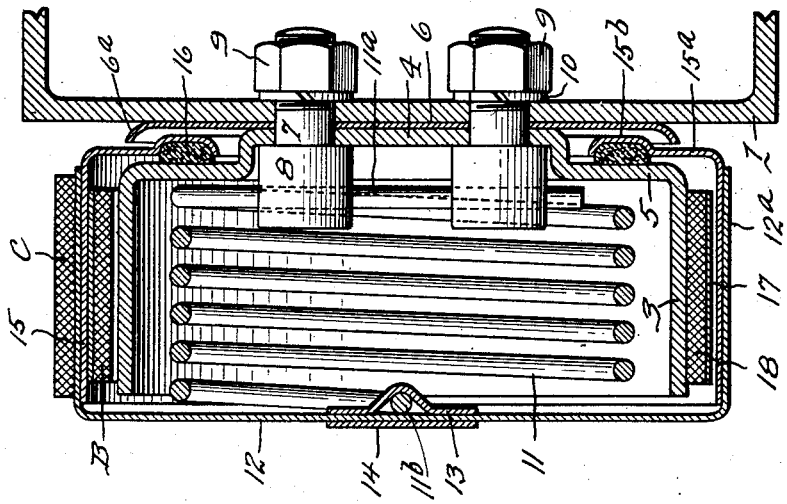
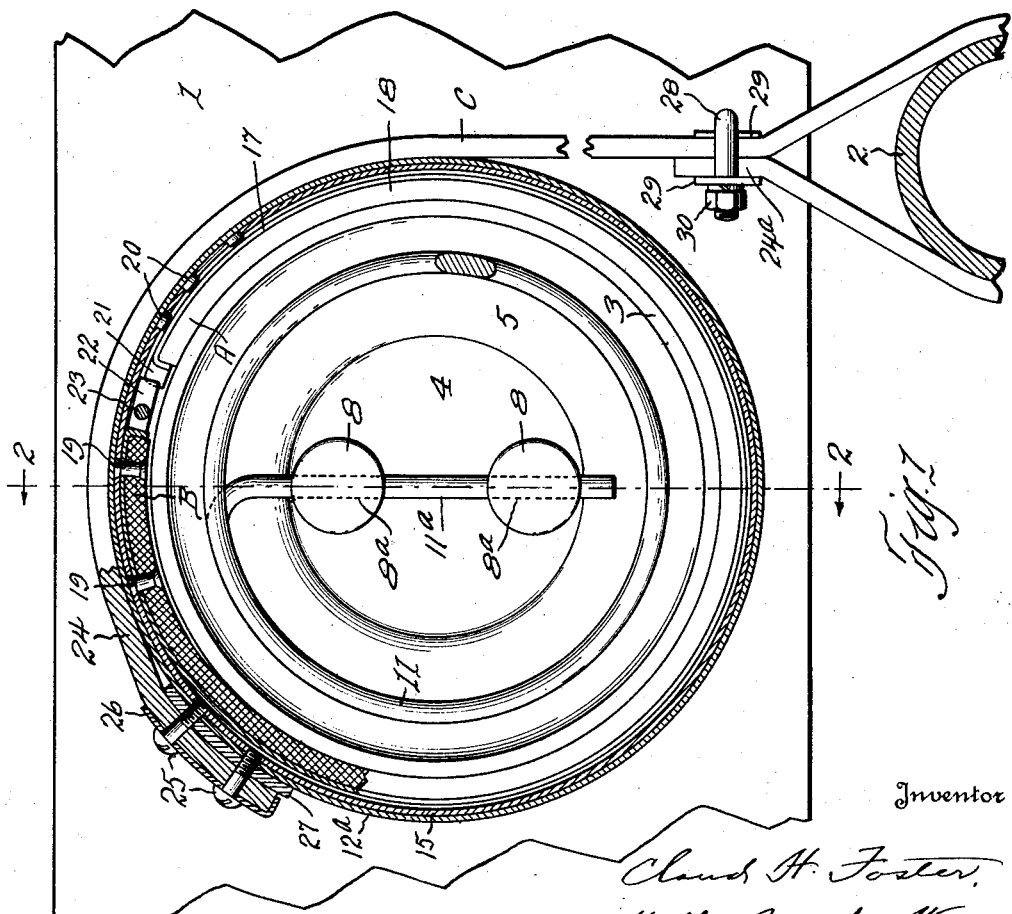
Inventor
Claud H. Foster,
By Hull, Brock West,
Attorneys April 11, 1933. C. H. FOSTER 1,903,447
SHOCK ABSORBER
Filed June 7, 1929 3 Sheets-Sheet 2
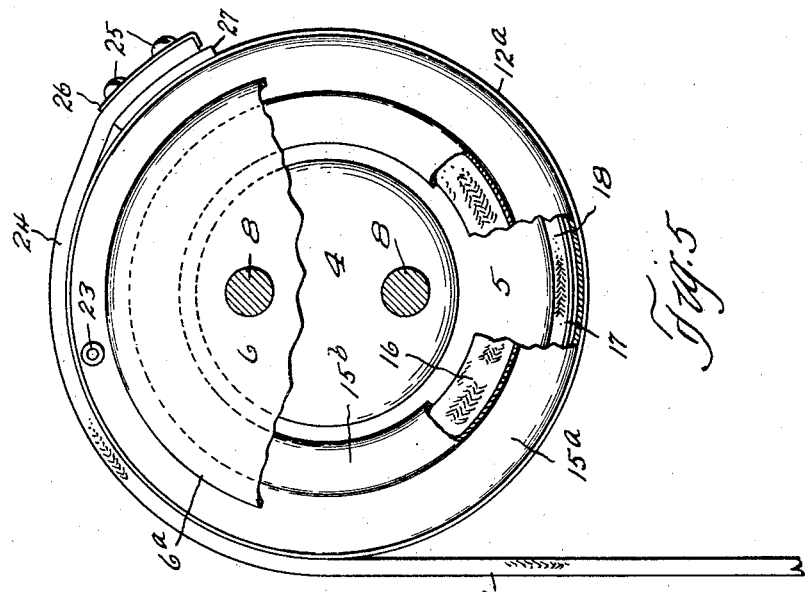
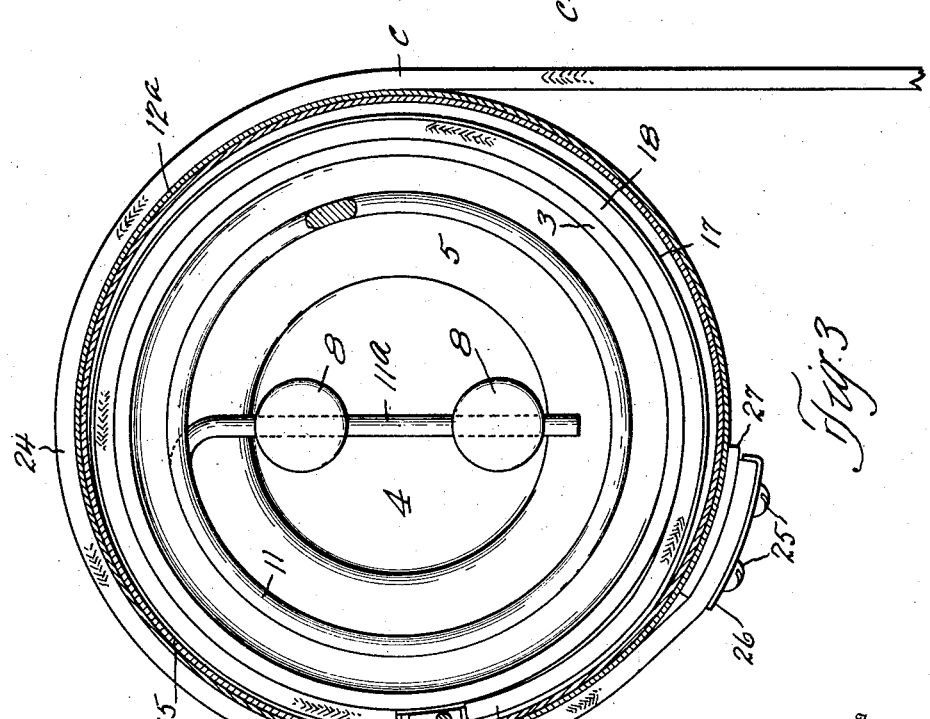
Inventor
Claud H. Foster
By Hull, Buck West
Attorneys April 11, 1933.  C. H. FOSTER  1,903,447
SHOCK ABSORBER
Filed June 7, 1929　　3 Sheets-Sheet 3
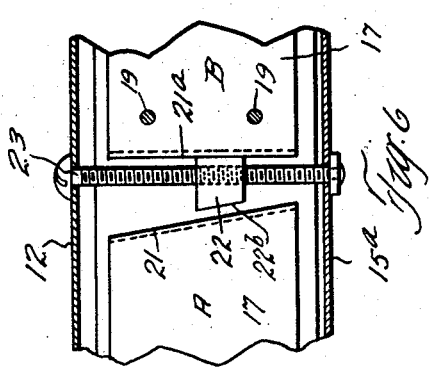
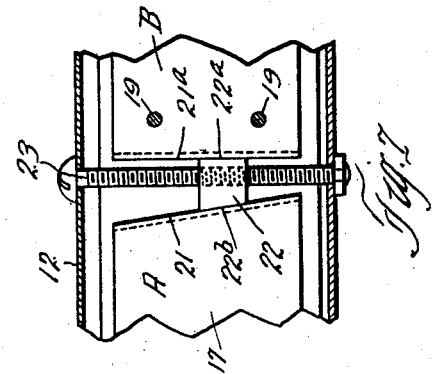
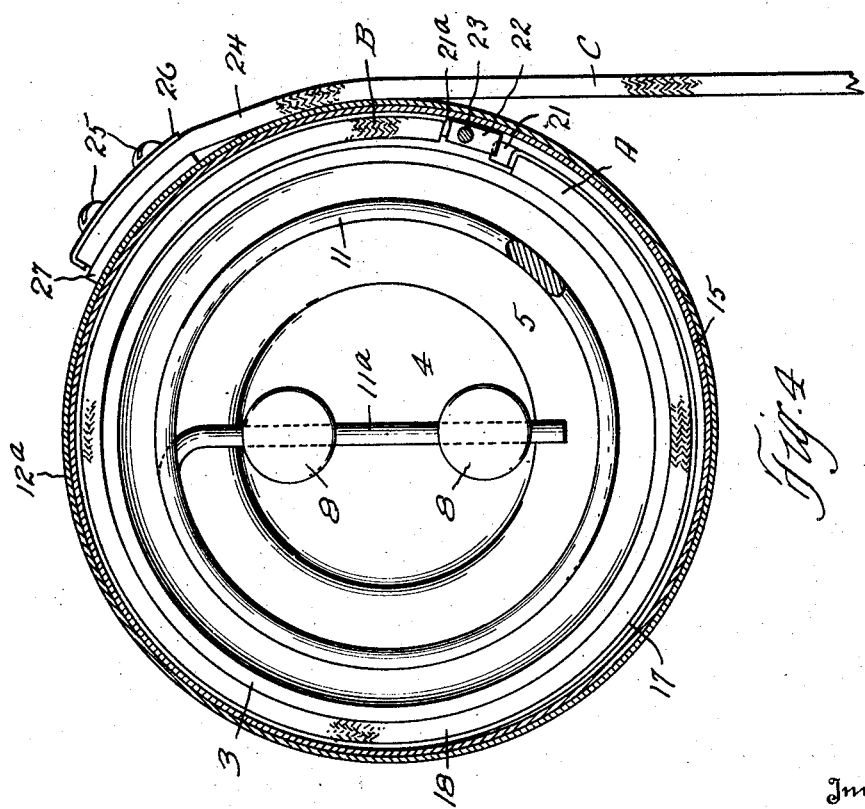

Patented Apr. 11, 1933

1,903,447

UNITED STATES PATENT OFFICE

CLAUD H. FOSTER, OF WICKLIFFE, OHIO

SHOCK ABSORBER

Application filed June 7, 1929. Serial No. 369,038.

This invention relates to shock absorbers such as are interposed between the axles and bodies of automobiles for the purpose of checking relative movements therebetween due to the encountering of obstacles or depressions by the wheels, and is an improvement of the shock absorber shown in my copending application, Serial No. 285,910, filed June 16, 1928.

The shock absorber herein shown consists generally of a brake drum with a composite brake band arranged externally of the drum, and a strap operatively connected to the said band for operating the same, there being a spring connected with the band for taking in the slack of the strap and for moving the brake band therewith, as the vehicle members approach each other.

It is the general purpose and object of the invention to provide a shock absorber which is not only simple of construction and economical of production, but will automatically effect the gripping or braking action of the brake band upon the drum by the separation of the body and axle and which also will automatically effect the release of such gripping or braking action under conditions to be pointed out hereinafter. A further object of the invention is to provide a shock absorber of this character with means for varying the gripping or braking action of the band upon the drum, thereby to adapt the shock absorber for varying conditions in service.

A still further object of the invention is to provide a shock absorber of this type which is capable of withstanding and accommodating all ordinary incidents of use. Further and more limited objects of the invention will appear hereinafter and will be realized in and through the construction and arrangement of parts shown in the drawings hereof; wherein Fig. 1 represents a sectional elevation of a shock absorber constructed in accordance with my invention, showing the parts in the positions which they occupy when the vehicle springs are compressed somewhat more than under ordinary or normal riding conditions; Fig. 2, a sectional view corresponding to the line 2—2 of Fig. 1; Fig. 3, a view similar to Fig. 1, showing the parts in the positions which they assume when the axle and vehicle body have approached each other following a more severe compression of the vehicle springs; Fig. 4, a view similar to Figs. 1 and 3, showing the positions of the parts when the body and axle shall have separated a sufficient distance to release the braking action; Fig. 5, a rear elevation of the shock absorber shown in the preceding views, with certain parts broken away; Figs. 6 and 7 are details in sectional elevation showing the ends of the brake band and the cooperating adjustable stop for varying the gripping action of the said band.

Describing the various parts by reference characters, 1 denotes one of the side frame members and 2 the axle housing of a vehicle. 3 denotes a cylindrical brake drum having a bottom or back wall, the central portion 4 of which is offset outwardly from the peripheral portion 5, such offset portion being seated within a metal disk 6 having a rounded peripheral flange 6ª. The brake drum is secured to the side frame member 1 by means of bolts, the shanks of which are indicated at 7 and which shanks project through openings in the parts 1, 4 and 6. Each bolt is provided with an enlarged cylindrical head 8 within the body of the brake drum, the opposite ends of the bolts being threaded and provided with nuts 9 and lock washers 10.

The bolt heads 8 are provided each with a transverse bore 8ª adapted to receive the inner end 11ª of a helical spring 11, thereby to anchor the spring within the drum. The outer end 11ᵇ of the said spring is secured to the inner or rear face of the flat front or outer plate 12 of the outer cover member of a housing, which cover member comprises the said plate and a cylindrical wall 12ª. The end 11ᵇ may be secured to the plate 12 in any convenient manner, as by means of one or more inner clamping members 13 having each a V-shaped groove at its center adapted to engage the said end of the spring, the clamping members being riveted through the plate 12 to a plate 14 on the front of the plate 12, which plate 14 may be a name plate.

The wall 12ª telescopes over a cylindrical wall 15 of the rear or inner housing member, and the latter wall merges with a rear annular wall 15ª having its inner edge spaced from the central portion 4 of the base of the brake drum. The rear annular wall 15ª is provided with an inwardly extending annular groove 15ᵇ therein, which is adapted to receive a packing ring 16, which packing ring engages the portion 5 of the rear or inner wall of the brake drum, thereby to prevent the entrance of dust into the interior of the housing which encloses the brake drum and the brake band. The entrance of dust is further prevented by means of the flanged disk 6, 6ª.

The housing constituted by the parts 12, 12ª and 15, 15ª is spaced from the brake drum and is movable with reference thereto, for a purpose to be explained hereinafter.

17 denotes a spring metal band having therewithin and attached to one end thereof a friction band 18, the said band being of any suitable material, such as fabric belting. The spring band 17 is given a curvature such that it tends to hold the band 18 in close engagement with the outer surface of the drum 3. The composite band comprising the parts 17 and 18 is of such length that, when applied to the drum, its ends will be spaced apart. It is connected at one end to the housing wall 15 by means of rivets 19. The thickness of the composite band is less than the normal width of the space between the brake band and the housing wall 15, so that the end B of the brake band which is attached to the housing wall 15 is lifted clear of and spaced from the said drum, as shown particularly in Figs. 1, 2 and 4. All of the brake band except the part adjacent to the rivets 19 is in engagement with the brake drum, due to the curvature of the band 17; and the end A of such composite band which is opposite that connected to the housing is further pressed into engagement with the brake drum by studs 20 of anti-friction material (such as arguta wood) which are mounted in the wall 15 and engage the outer surface of the band 17. The ends of the band 17 are flanged toward the brake drum, as shown at 21, 21ª, one end of the band 18 being inclined and the flange 21 being inclined to correspond thereto, as shown in Figs. 1, 4, 6 and 7. The opposite end of the band 18 is cut off at right angles to the length of the said band and the flange 21ª also extends at right angles to the length of the band 17. Because of this construction of the ends of the composite brake band, the flanges 21 and 21ª converge from the outer or front of the housing toward the rear. In the space between these flanges a block 22 is slidably mounted, the said block having a face 22ª adapted to engage the flange 21ª and a tapered face 22ᵇ adapted to engage the flange 21. This block is mounted for adjustment in the space between the ends of the brake band upon a screw bolt 23 which is mounted in the walls 12 and 15ª. By rotating this screw bolt, the position of the block 22 may be varied, for a purpose to be explained hereinafter.

For the purpose of causing the brake band to function through the separation of the body and axle, I secure to the housing the upper end portion 24 of a strap C. This strap is conveniently secured to both walls 12ª and 15 of the housing by means of short screw bolts 25 extending through a metal plate 26 on the outer surface of the strap and through a curved metal plate 27 welded to the housing wall 12ª and through the said wall and the wall 15. The lower portion of the strap C is looped around the axle housing 2, and the extreme end 24ª of such portion is fastened to the body of the strap by means of a U-bolt 28, plates 29, and nuts 30 on the ends of the legs of the bolt.

In Figs. 1 and 2, the parts A and B are shown as somewhat above the positions which they occupy during ordinary or normal riding. Owing to the fact that the housing floats with reference to the brake drum, some light pressure will be exerted through the strap C and the end B of the brake band upon the drum. The opposite end B of the strap will be free from the drum, as explained hereinbefore. It will be noted that, when in the position shown in Figs. 1 and 2, the brake band can travel in a clockwise direction only a short distance before the strap C will be substantially tangent to the surface of the part of the housing immediately over such built-up end. The purpose of this arrangement will be explained hereinafter.

With the parts constructed and arranged as described, when the wheels encounter an obstacle which moves the axle toward the body, the spring 11 will move the brake band freely in a counter-clockwise direction around the brake drum, taking in the slack of the strap C. No matter how rapid may be the movement of the axle toward the body, or vice versa, the spring is under sufficient torsion to enable it immediately to move the brake band around the drum and to take in the slack of the strap. At the end of this movement, the parts may be approximately in the positions shown in Fig. 3, with the block 22 engaging the flange 21ª with one side thereof but having its beveled side spaced from the flange 21. On rebound, or separation of the body and axle, the strap C, due to the floating of the housing to which it is connected as well as to the somewhat yielding nature of the housing, will press the end A of the brake band against the drum, while pulling on the opposite end of the strap, against such pressure. This pressing of the end A of the brake band will be accomplished through the anti-friction studs 20, which will permit the housing to slide over said studs, while holding the end A in engagement with the brake drum.

Further movement of the housing will cause the flange 21 to engage the beveled edge of the block 22, at which time the brake band will have gripped the brake drum with the desired amount of friction. It will be evident that, by moving the block toward the widened end of the gap between the ends of the brake band, the greater will be the movement of the end B of the band toward the end A, with a corresponding increase in the gripping action between the band and the drum. Irrespective of the position of the block 22, the more severe or rapid the rebound of the vehicle body, the more quickly and strongly will the brake band act upon the drum, with the result that the rebound or separation will be resisted in proportion to such violence of action or rapidity of separation. The adjustable block 22 permits, however, of a variation in the amount of braking resistance to such rebound movements.

However, it is not desirable that the braking action shall continue throughout the entire range of rebound movement, as this would interfere with ease of riding and with the desirable action of the vehicle springs. Therefore, as the end A of the brake band approaches a position where the strap C is tangent to the housing, the pressure of such end A of the band upon the brake drum is relaxed and, when this position of tangency is reached and the said end shall have passed beyond the point where it can be pressed against the drum by the strap C, further separation will be resisted only by the vehicle springs and by the comparatively slight resistance afforded by the spring 11 and the then light grip of the brake band.

An important further advantage of the construction and arrangement of parts shown herein is that, when riding under normal conditions, if one or more of the wheels of the vehicle should drop into a hole in the road, there will be practically no braking action, as the end A of the brake band is so located that it is not pressed against the brake drum by the brake band and passes below the point where such action can occur. This prevents the body from being pulled down by the axle, to the discomfort of the occupants of the vehicle.

Furthermore, because of the fact that the housing is movable or floats with reference to the brake drum and because of the fact that the metal of which it is composed is resilient, the end A of the brake band will always be in effective engagement with the brake drum and the housing when the body and axle are moving away from each other— up to the point where the end A shall have passed below the place at which it is subjected to the pressure of the strap C.

In describing the invention, it has been assumed, for convenience of description, that the brake drum and housing will be carried by one of the side frame members and that the strap C will be secured to the upper portion of the housing and extend around such upper portion, with its lower end secured to the axle housing; and the terms "upper" and "lower" have been used in connection with such description, but without any intention of limiting thereby the use of the invention to such specific location and arrangement of parts.

Furthermore, while I have described the flexible member C as a "strap", I do not intend thereby to limit my invention as to the use of any particular material or to any particular shape of material which may be employed for such strap or member.

The spring 11 is normally under light compression, as well as under torsion, whereby it presses the packing 16 against the back wall 5 of the brake drum, thereby compensating for wear and preventing entrance of dust, etc., into the housing.

Having thus described my invention, what I claim is:

1. A shock absorber comprising an inner brake drum, a housing surrounding and spaced from said drum and radially movable with respect to the said drum, a brake band interposed between the housing and the drum, the said band comprising an inner friction band and an outer spring metal band, one end of the spring metal band pressing the adjacent end of the friction band against the drum, means connecting the opposite end of the friction band and spring band to the housing, there being a space normally provided between such attached ends of the said bands and the brake drum, a strap connected to the said housing, a spring connected to the housing and tending to resist turning of the housing by the strap, and anti-friction means interposed between the housing and the free end of the spring metal band.

2. A shock absorber comprising an inner brake drum, a housing surrounding and spaced from said drum and radially movable with respect to the said drum, a brake band interposed between the housing and the drum, means connecting one end of the band to the housing, there being a space normally provided between such attached end of the said band and the brake drum, a strap connected to the said housing, a spring connected to the housing and tending to resist turning of the housing by the strap, and anti-friction means interposed between the housing and the free end of the brake band.

3. A shock absorber comprising an inner brake drum, a housing surrounding and spaced from said drum and radially movable with respect to the said drum, a brake band interposed between the housing and the drum, the said band comprising an inner friction band and an outer spring metal band, one end of the spring metal band pressing the adjacent end of the friction band against the drum, means connecting the opposite end of the friction band and spring band to the housing, there being a space normally provided between such attached ends of the said bands and the brake drum, a strap connected to the said housing, a spring connected to the housing and tending to resist rotation of the housing by the strap, and a plurality of anti-friction studs mounted in the housing and arranged to engage the free end portion of the spring metal band.

4. A shock absorber comprising an inner brake drum, a housing surrounding and spaced from said drum and radially movable with respect to the said drum, a brake band interposed between the housing and the drum, the said band comprising an inner friction band and an outer spring metal band, one end of the spring metal band pressing the adjacent end of the friction band against the drum, means connecting the opposite end of the friction band and spring band to the housing, there being a space normally provided between such attached ends of the said bands and the brake drum, a strap connected to the said housing, a spring connected to the housing and tending to resist rotation of the housing by the strap, a plurality of anti-friction studs mounted in the housing and arranged to engage the free end portion of the spring metal band, and means for varying the extent of movement of the attached end of the brake band toward the unattached end thereof.

5. A shock absorber comprising an inner brake drum, a housing surrounding the said drum and radially movable with respect thereto, a brake band interposed between the housing and the brake drum and having its ends spaced apart, means for pressing one end of said band against the brake drum, means connecting the opposite end of the band to the housing and normally spacing such end from the housing, a strap secured to the housing for turning the latter with respect to the drum, a spring connected to the housing for resisting such turning movement by the strap, and means for varying the extent of movement of the attached end of the band toward the unattached end thereof, thereby to vary the frictional resistance opposed by such band to the turning movement of the housing.

6. A shock absorber comprising an inner brake drum, a housing surrounding the said drum and radially movable with respect thereto, a brake band interposed between the housing and the brake drum, means connecting one end of the band to the housing, a strap secured to the housing for turning the latter with respect to the drum, a spring connected to the housing for resisting such turning movement by the strap, and means for varying the gripping action of the brake band upon the drum, thereby to vary the frictional resistance opposed by such band to the turning movement of the housing.

7. A shock absorber comprising an inner brake drum, a housing surrounding the said drum and radially movable with respect thereto, a brake band interposed between the housing and the drum and having one end in engagement with the drum and its opposite end connected to the housing and normally spaced from the drum, the ends of the said band being spaced and one of such ends being inclined, a block interposed between the ends of the brake band and adjustable along the space provided therebetween, the said block having an inclined face adapted to cooperate with the inclined end of the band, a strap secured to the housing for turning the latter with respect to the drum, a spring connected to the housing for resisting such turning movement by the strap, and means for varying the amount of movement of the attached end of the band toward the unattached end thereof, thereby to vary the frictional resistance opposed by such band to the turning movement of the housing.

8. A shock absorber comprising an inner brake drum, a housing surrounding the said drum and radially movable with respect thereto, a composite band interposed between the housing and the drum, the said band comprising an inner friction band and an outer spring metal band, the spring band being provided with end flanges constituting the ends of the composite band, one of such end flanges being inclined, with a space between such flanges, one of the ends of said composite band being in engagement with the drum and the other end being connected to the housing and normally spaced from the drum, a block interposed between the ends of the brake band and adjustable along the space provided therebetween, the said block having an inclined face adapted to cooperate with the inclined flange of the band, a strap secured to the housing for turning the latter with respect to the drum, and a spring connected to the housing for resisting such turning movement by the strap.

In testimony whereof, I hereunto affix my signature.

CLAUD H. FOSTER.